(12) United States Patent
Twerdahl et al.

(10) Patent No.: US 7,664,485 B2
(45) Date of Patent: *Feb. 16, 2010

(54) MAKING A PHONE CALL FROM AN ELECTRONIC DEVICE HAVING AN ADDRESS LIST OR A CALL HISTORY LIST

(75) Inventors: Tim Twerdahl, Los Altos, CA (US); Stephane Maes, Mountain View, CA (US); Benoit Vialle, Evanston, IL (US); Ryan Robertson, Seattle, WA (US)

(73) Assignee: PalmSource Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/927,698

(22) Filed: Oct. 30, 2007

(65) Prior Publication Data

US 2008/0051074 A1 Feb. 28, 2008

Related U.S. Application Data (63) Continuation of application No. 09/677,831, filed on Sep. 29, 2000, now Pat. No. 7,289,614.

(51) Int. Cl.
*H04B 1/38* (2006.01)

(52) U.S. Cl. .............. 455/408; 455/414.3; 455/422.1; 455/426; 455/466; 455/557; 379/88.02; 379/201.01; 709/204; 705/39; 705/40; 715/207

(58) Field of Classification Search ............... 455/406, 455/408, 410, 412.1, 414.1, 414.3, 415, 557, 455/569.2, 420, 422.1, 435.1, 426, 456.3, 455/466, 556, 566, 418; 370/335, 352; 379/201.01, 379/88.02, 140; 345/156; 715/207, 501.1; 709/204, 223; 707/3, 102; 439/152; 705/39, 705/40, 64

See application file for complete search history.

(56) References Cited

U.S. PATENT DOCUMENTS

| | | | | |
|---|---|---|---|---|
| 5,425,077 | A | 6/1995 | Tsoi | 455/566 |
| 5,493,105 | A | 2/1996 | Desai | 235/375 |
| 5,608,784 | A * | 3/1997 | Miller | 379/88.02 |
| 5,734,706 | A | 3/1998 | Windsor et al. | 379/142 |
| 5,742,669 | A | 4/1998 | Lim | 379/130 |
| 5,809,415 | A * | 9/1998 | Rossmann | 455/422.1 |
| 5,825,353 | A | 10/1998 | Will | 345/184 |
| 5,903,632 | A | 5/1999 | Brandon | 379/93.23 |
| 6,064,725 | A * | 5/2000 | Nakanishi | 379/140 |
| 6,178,338 | B1 | 1/2001 | Yamagishi et al. | 455/566 |
| 6,181,689 | B1 * | 1/2001 | Choung et al. | 370/352 |
| 6,288,718 | B1 | 9/2001 | Laursen et al. | 345/347 |
| 6,295,550 | B1 * | 9/2001 | Choung et al. | 709/204 |
| 6,332,133 | B1 * | 12/2001 | Takayama | 705/39 |

(Continued)

Primary Examiner—William D Cumming
(74) Attorney, Agent, or Firm—Berry & Associates P.C.

(57) ABSTRACT

A method and apparatus of managing a phone device of a personal digital assistant (PDA) is provided. In one example of the present invention, the PDA retrieves a call history list from a stored memory location, the call history list including a call history list record. The PDA then displays at least a portion of the call history list on a screen of the PDA. The call history list preferably includes phone numbers and names associated with those phone numbers. In another example, the method further includes displaying call details of a selected call history list record. The call details preferably includes a date, a timestamp, and a duration.

30 Claims, 7 Drawing Sheets

U.S. PATENT DOCUMENTS

| | | | |
|---|---|---|---|
| 6,374,125 B1 | 4/2002 | Toba | 455/563 |
| 6,393,006 B1* | 5/2002 | Kajihara | 370/335 |
| 6,466,236 B1 | 10/2002 | Pivowar et al. | 345/835 |
| 6,487,195 B1* | 11/2002 | Choung et al. | 370/352 |
| 6,600,930 B1* | 7/2003 | Sakurai et al. | 455/414.3 |
| 6,625,446 B1* | 9/2003 | Mochizuki | 455/421 |
| 6,697,825 B1* | 2/2004 | Underwood et al. | 715/207 |
| 7,152,207 B1* | 12/2006 | Underwood et al. | 715/207 |
| 7,162,222 B2* | 1/2007 | Lapstun et al. | 455/410 |
| 7,162,259 B2* | 1/2007 | Lapstun et al. | 455/466 |
| 7,162,269 B2* | 1/2007 | Lapstun et al. | 455/557 |
| 7,280,852 B2* | 10/2007 | Shimizu et al. | 455/569.2 |
| 7,283,813 B2* | 10/2007 | Hamanaga et al. | 455/415 |
| 7,289,614 B1* | 10/2007 | Twerdahl et al. | 379/142.01 |
| 7,295,839 B1* | 11/2007 | Lapstun et al. | 455/420 |
| 7,383,250 B2* | 6/2008 | Scian et al. | 707/3 |
| 7,392,226 B1* | 6/2008 | Sasaki et al. | 705/64 |
| 7,441,034 B2* | 10/2008 | Tsurusaki et al. | 709/227 |
| 2002/0039899 A1* | 4/2002 | Rossman | 455/426 |
| 2002/0194121 A1* | 12/2002 | Takayama | 705/39 |
| 2003/0100295 A1* | 5/2003 | Sakai et al. | 455/415 |
| 2003/0103611 A1* | 6/2003 | Lapstun et al. | 379/201.01 |
| 2003/0118166 A1* | 6/2003 | Lapstun et al. | 379/201.01 |
| 2003/0126288 A1* | 7/2003 | Tsurusaki et al. | 709/239 |
| 2003/0167230 A1* | 9/2003 | McCarthy | 705/40 |
| 2003/0169864 A1* | 9/2003 | Lapstun et al. | 379/201.01 |
| 2004/0056837 A1* | 3/2004 | Koga et al. | 345/156 |
| 2004/0137875 A1* | 7/2004 | Ueno | 455/408 |
| 2004/0235520 A1* | 11/2004 | Cadiz et al. | 455/557 |
| 2005/0005032 A1* | 1/2005 | Naruse | 710/1 |
| 2006/0025112 A1* | 2/2006 | Hamanaga et al. | 455/412.1 |
| 2006/0033706 A1* | 2/2006 | Haitani et al. | 345/156 |
| 2006/0111090 A1* | 5/2006 | Lapstun et al. | 455/414.1 |
| 2006/0128359 A1* | 6/2006 | Jung | 455/406 |
| 2006/0168539 A1* | 7/2006 | Hawkins et al. | 715/780 |
| 2006/0200751 A1* | 9/2006 | Underwood et al. | 715/501.1 |
| 2007/0083623 A1* | 4/2007 | Nishimura et al. | 709/223 |
| 2007/0123224 A1* | 5/2007 | Nishiyama et al. | 455/414.1 |
| 2007/0128899 A1* | 6/2007 | Mayer | 439/152 |
| 2007/0281689 A1* | 12/2007 | Altman et al. | 455/435.1 |
| 2008/0051074 A1* | 2/2008 | Twerdahl et al. | 455/418 |
| 2008/0109472 A1* | 5/2008 | Underwood et al. | 707/102 |
| 2008/0139225 A1* | 6/2008 | Hsieh et al. | 455/456.3 |
| 2008/0167083 A1* | 7/2008 | Wyld et al. | 455/566 |

* cited by examiner

MAKING A PHONE CALL FROM AN ELECTRONIC DEVICE HAVING AN ADDRESS LIST OR A CALL HISTORY LIST

CROSS REFERENCE TO RELATED APPLICATIONS

This application is a continuation application of application Ser. No. 09/677,831, entitled "MAKING A CALL FROM AN ADDRESS LIST OR A CALL HISTORY LIST", filed Sep. 29, 2000, to be issued as U.S. Pat. No. 7,289,614. The subject matter in the above-identified co-pending and commonly owned application(s) is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to telecommunications and, more particularly, to providing phone applications in a portable computer system.

2. Discussion of Background

Personal computer systems have become common tools in modern society. To organize their lives, many personal computer users use personal information management applications such as an address book and a daily organizer on their personal computers. Although such applications have proven useful for personal information management, their utility is limited by the fact that the person must be sitting at their personal computer system to access the information.

To remedy this limitation, many palmtop computers, electronic organizers and other handheld devices, commonly known as personal digital assistants ("PDA's") have been introduced. A PDA is a computer that is small enough to be held in the hand of a user and runs personal information management applications such as an address book, a daily organizer, and electronic notepads. These applications make people's lives easier.

The most popular brand of PDA is the Palm™ (not shown). However, the Palm™ is much more than a simple PDA. A Palm™ is small, slim, device, about the size of your wallet, can hold 6000 addresses, 5 years of appointments, 1500 to-do items, 1500 memos, 200 e-mail messages, and can run many different software applications.

The front panel of the Palm™ is a large LCD screen, which is touch-sensitive and allows a user to enter and manipulate data. By using a stylus to interact with a touch-sensitive screen, a user may easily navigate through a host of various software applications. A stylus is used to interact with information on a screen in much the same way as a mouse on a desktop personal computer.

Many PDA's offer Internet connectivity, as well as a vast array of hardware and software choices. PDA's have evolved into a new kind of handheld device that people use to instantly manage all kinds of information, from email, to medical data, to stock reports. Unfortunately, to date, PDA's have had only modest success in the marketplace, due to their high price tags, as well as their useful although limited applications.

In addition to being somewhat limited, many PDA applications have generally not been available in the PDA's counterpart—the mobile phone. Mobile phone manufacturers have taken the approach of trying to integrate PDA functionality into their mobile phones. This approach has several disadvantages. To fulfill their primary function of efficiently making phone calls, mobile phones are geared toward a different feature set from PDA'S. For example, as one of the design aims for mobile phones is ever-smaller size, Internet access is compromised. Mobile phones are an unattractive Internet access option because the screen on a mobile phone is typically much smaller than that of a PDA. A mobile phone can typically display only a small fraction of the amount information that a PDA can display.

Generally, many applications that are user-friendly on a PDA would be cumbersome in a mobile phone environment. Additional examples of such applications include inputting an address list and displaying a detailed record of calls. A mobile phone is therefore inherently unsuitable for navigating through even the simplest of PDA applications.

PDA's and mobile phones have been manufactured to meet different design aims. PDA's are primarily designed to provide personal information management in a small, portable device. Mobile phones are primarily designed for efficiently making phone calls while on the go. A mobile phone environment is generally not geared for running PDA software applications, including anything more than the lowest level of graphics.

SUMMARY OF THE INVENTION

It has been recognized that what is needed is an efficient system for integrating mobile phone functionality into a palmtop environment. Broadly speaking, the present invention fills these needs by providing a method and apparatus for integrating mobile phone functionality into a personal digital assistant (PDA). It should be appreciated that the present invention can be implemented in numerous ways, including as an apparatus, a system, a device, a process or a method. Several inventive embodiments of the present invention are described below.

In one embodiment, a method of managing a phone device of a PDA is disclosed. The PDA retrieves a call history list from a stored memory location, the call history list including a call history list record. The PDA then displays at least a portion of the call history list on a screen of the PDA. The call history list preferably includes phone numbers and names associated with those phone numbers.

In another embodiment, a method further includes displaying call details of a selected call history list record. The call details preferably includes a date, a timestamp, and a duration.

In still another embodiment, a PDA is disclosed that includes a phone device. The phone device comprises a selection mechanism configured to allow selection of a list having at least one list record; a display device configured to display at least a portion of the list and to allow selection of a list record; and a call device configured to initiate a phone call using a phone number associated with a selected list record.

Advantageously, the present invention provides a more convenient and efficient system for combining phone functionality with PDA functionality. Among other things, a user may utilize traditional mobile phone applications without having to deal with mobile phone inconveniences. A computer environment is described for software applications that require more robust computer systems and graphics capabilities than a typical mobile phone can provide. The computer environment that is described not only fulfills these requirements, but also has palm-size portability. Other embodiments, disclosed in detail below, illustrate how the present invention provides phone applications that are ideally applicable to the method and apparatus of the present invention.

The present invention is not limited to the specific embodiments described herein, namely a method, an apparatus, and a computer-readable medium. Rather the invention may encompass other features, embodiments and alternatives which will be apparent to those skilled in the art.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention is disclosed for a method and an apparatus for integrating mobile phone functionality into a personal digital assistant (PDA). In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

General Overview

Figure 1:
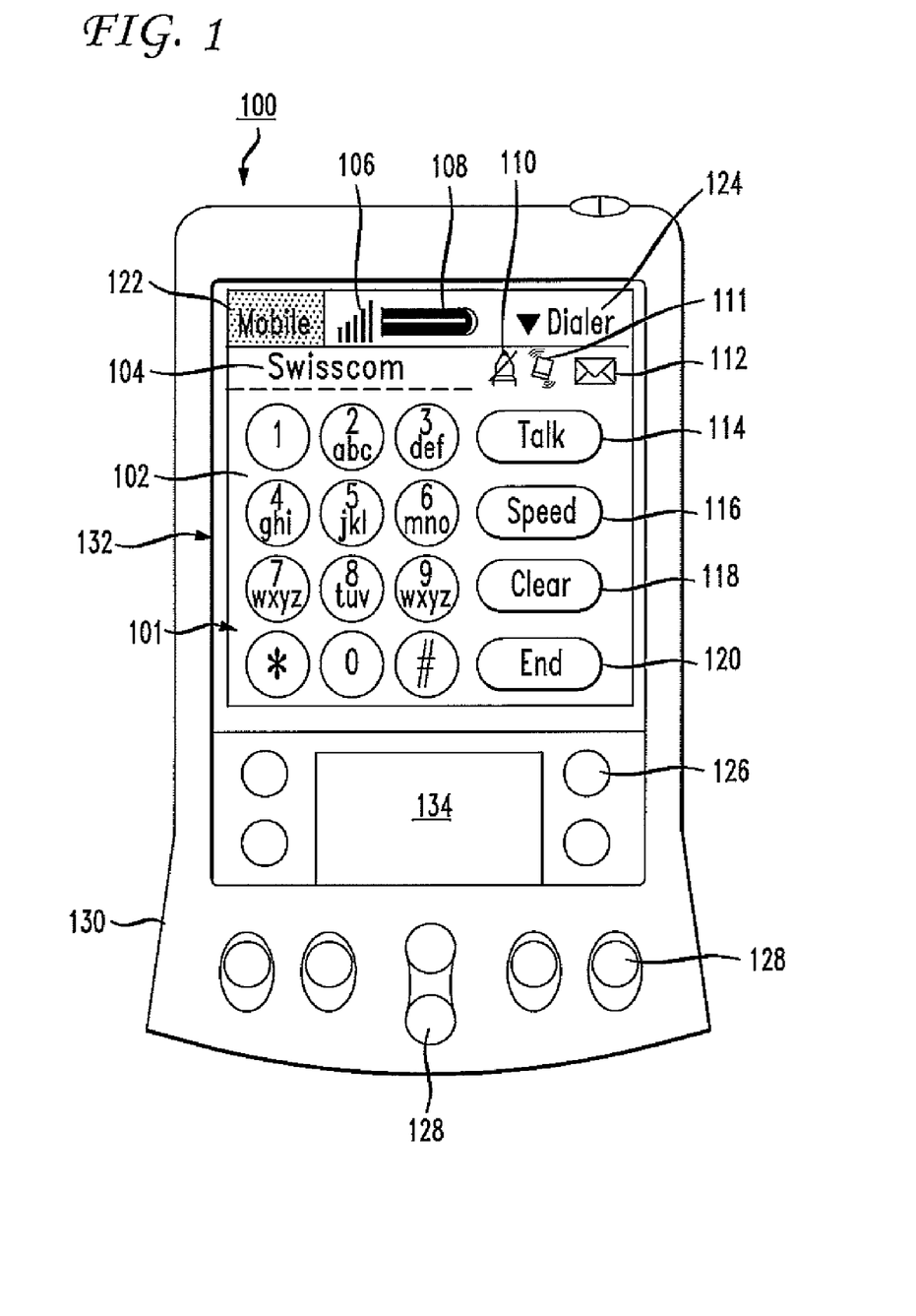
FIG. 1 shows a personal digital assistant (PDA), which incorporates a phone device feature, in accordance with one embodiment of the present invention.

FIG. 1 shows a personal digital assistant (PDA), which incorporates a phone device feature, in accordance with one embodiment of the present invention. Examples of a PDA include palm style computers, such as a Palm III™, Palm V™, or Palm VII™, organizers, manufactured by 3COM Corporation. Other embodiments of the invention include Windows CE™ handheld computers, other handheld computers, and other personal digital assistants.

The Palm™ and its operating environment are used herein to illustrate various aspects of the present invention. However, it should be understood that the present invention may be practiced on other devices, including other Palm™ models, PDA'S, computer devices, PC's, notebooks, etc.

The PDA 100 shown in FIG. 1 is preferably a combination of a processor and memory, having a portable energy source, and being incased in PDA housing 130. In one example, the PDA housing 130 is made of a lightweight, durable plastic material, and is ergonomically designed to be held in the palm of one hand. A PDA 100 combines computing, telephone/fax, and networking features, and can function as a cellular phone, fax sender, and personal organizer. A PDA 100 is preferably pen-based, using a stylus rather than a keyboard for input. This use of a stylus means that a PDA 100 preferably incorporates handwriting recognition features. In another embodiment, a PDA 100 can react to voice input by using voice recognition technologies.

The PDA 100 shown in FIG. 1 includes a plurality of hard buttons 128 and a display device 132 fixed in the PDA housing 130. The display device 132 may be provided with a graphical user interface that allows a user to select and alter displayed content using a stylus. A plurality of soft buttons 126 for performing automated or pre-programmed functions may be provided on a portion of the display device. In one embodiment, a soft button 126 is a tap recognizer configured to initiate a predetermined routine when a user taps the soft button 126. In an alternative embodiment, the display device 132 also includes a Graffiti™ writing section 134 for tracing alphanumeric characters as input.

Structural Overview

As shown in FIG. 1, a call device 101 is active on the display device 132. A phone device in the PDA 100 runs the call device 101. The phone device is preferably software, hardware, or combination thereof that allows a user to perform functions of a mobile phone. Such mobile phone functions may include, for example, dialing phone numbers, placing phone calls, receiving phone calls, and receiving voicemail. When the PDA 100 is performing functions of a mobile phone, a mobile phone indicator 122, preferably located near the top portion of the screen of the PDA 100, is activated.

When the call device 101 is displayed on the screen of PDA 100, the PDA 100 preferably indicates by a phone status icon 124 that the call device 101 is in dialer mode. The call device 101 preferably includes a dialer pad 102, which allows a user to input numbers, letters, punctuation, or other symbols into the call device 101. Digits may be inputted, for example, to dial a phone number or to load a phone number into a memory of the PDA 100. Letters may be inputted, for example, to load a person's name, address, or other information into memory of the PDA 100.

The call device 101 of FIG. 1 is displayed at a time when the call device 101 is in the process of initiating a phone call. In other words, FIG. 1 shows a screen shot of the call device 101 at a time when the call device 101 is in dialing mode.

A name 104 of a person preferably is displayed near the top portion of the call device 101 to indicate that a phone number dialed has been recognized by the PDA 100. In one embodiment, upon initiating the phone call, the PDA 100 searches in memory for a name associated with the dialed phone number. In FIG. 1, "Mindy Chahal-w-" is the name that is recognized by the PDA 100. In this example, the PDA 100 is attempting to contact a device that is indicated to be associated with Mindy Chahal at her work. A dialer status icon 110 is preferably included near the top portion of the call device 101 to indicate to the user that the call device 101 is in the process of initiating the phone call.

The embodiment of FIG. 1 shows other features that may be initiated in the call device 101. A user may initiate these other applications by pressing a button icon, such as a save button 114, a note button 116, a mute button 118, or an end button 120. User activation of the Save button 114 saves the phone number associated with a call the user is currently engaged to the address book. User activation of the note button 116 activates an in-call note taking service. User activation of the mute button 118 mutes the caller at the other end of the line (other caller). This muting which keeps the other caller from hearing any conversation initiated at the users side of the conversation. User activation of the end button 120 terminates the call that the user is currently participating.

Where a user of the PDA 100 has received a voicemail message, a voicemail indicator 112 preferably appears near the top portion of the screen of the PDA 100. The call device 101 of the PDA 100 preferably has at the top of the screen a signal strength indicator 106 and a battery charge indicator 108. The signal strength indicator 106 shows a relative quality and strength of a signal that may be transmitted in a mobile phone network in which the call device 101 is located. The battery charge indicator 108 shows a relative amount of energy remaining in the battery of the PDA 100.

Structural Overview

Figure 2:
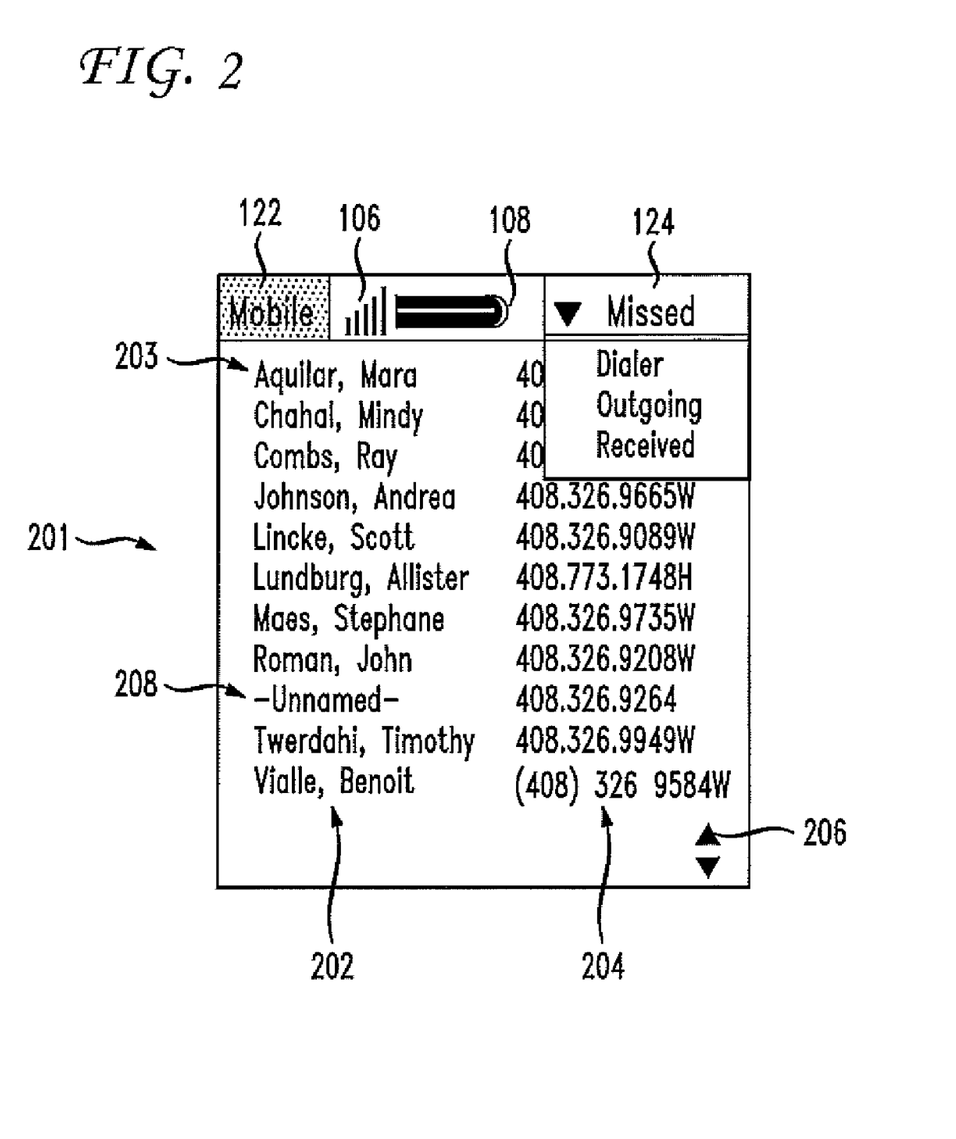
FIG. 2 shows screen shot on the PDA of FIG. 1 of a list having at least one list record, in accordance with one embodiment of the present invention.

FIG. 2 shows screen shot on the PDA of FIG. 1 of a list 201 having at least one list record 203, in accordance with one embodiment of the present invention. A user may easily navigate through various applications of the PDA 100. Such applications include a call device 101 and a list 201. Navigation through different screens of these applications may be performed in several different ways. In one embodiment, the user presses a hard button a given number of times on a front panel of the PDA 100 to navigate through applications of the phone device. In another embodiment, the user taps the phone status icon 124 in the top-right corner to show names of different applications or screens available. As shown in FIG. 2, these different applications may include a "Dialer" application, a "Outgoing" calls list application, and an "Received" call list application. These applications provide additional functionality to the phone device of the PDA 100. The present invention, however, is not limited to these specific embodiments.

A list 201 may be of several types. In the embodiment of FIG. 2, the list 201 is a call history list, and the list records 203 are call history list records. The call history list of FIG. 2 is one specific example of a list 201. A call history list preferably contains call history list records of incoming, outgoing, missed, or received calls. Another type of list is an address list (not shown) having at least one address list record of phone numbers and names associated with those phone numbers 204.

The list 201 of FIG. 2 has call history list records that have phone numbers 204 and names 202 associated with those phone numbers 204. The embodiment of FIG. 2 shows a call history list of missed calls. A missed call is an incoming call that was not answered by the user.

Where an incoming or outgoing call can be matched with a phone number 204 in memory, the phone number 204 is shown in the list record 203 of the call history list. Where an incoming or outgoing call can be matched with a name 202 in memory, the name 202 is also shown in the list record 203 of the call history list. This matching occurs when a name 202 is previously stored in memory, such as in an address book of the PDA 100, and is associated with the phone number 204. When the phone number 204 is identified in the address book, the associated name 202 is included in the appropriate call history list record. Where an incoming or outgoing call does not have a name 202 associated with a phone number in memory, the call history list preferably stores an "unnamed" list record 208."

A set of scroll arrows 206 is another preferred feature of the list 201. The scroll arrows 206 allow a user to scroll up and down through the list 201 if an entire list 201 cannot fit on the screen of the PDA 100.

Figure 3:
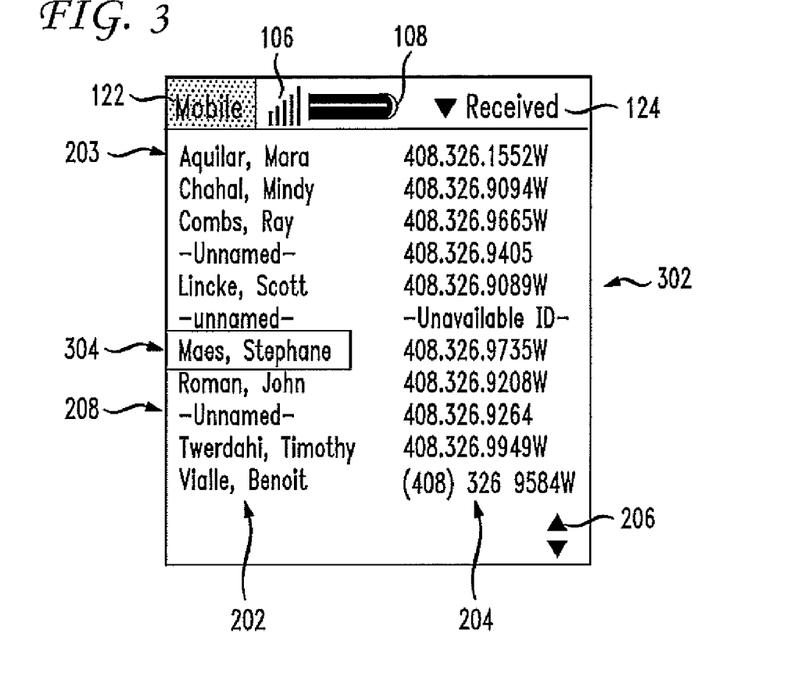
FIG. 3 shows a screen shot of a call history list, which includes at least one list record and a selected name, in accordance with one embodiment of the present invention.

FIG. 3 shows a screen shot of a call history list, which includes at least one list record 203 and a selected name 304, in accordance with one embodiment of the present invention. The phone status icon 124 in FIG. 3 indicates that the phone device is presently showing a call history list of received calls. The list 201 is shown as it preferably appears on a display device of a phone device in a PDA 100. When an incoming call cannot be identified by a phone number 204, the call history list preferably contains a list record 203 with an unavailable ID indicator 302.

Once a call history list is displayed, as in FIG. 3, the user may initiate functions of the phone device by interacting with the screen through a stylus. The PDA 100 preferably includes selection mechanism that recognizes when part of a list 201 has been selected. In one embodiment, the user may tap on a selected name 304 if the user wants to view details of a selected call. By tapping the screen of the display device of the PDA 100, the user triggers a tap recognizer in the PDA 100. A tap recognizer is hardware, software, or combination thereof. In this example, the tap recognizer is configured to sense that the selected name 304 has been chosen. A rectangle preferably then appears around the selected name 304.

Figure 4:
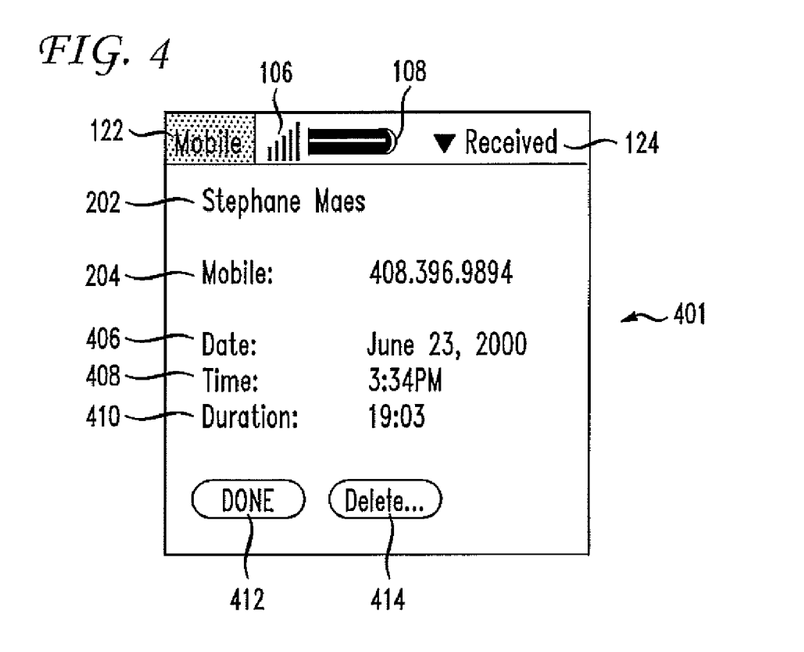
FIG. 4 shows a screen shot of call details of a selected name from a call history list, in accordance with one embodiment of the present invention.

FIG. 4 shows a screen shot of call details 401 of a selected name 304 from a call history list, in accordance with one embodiment of the present invention. This screen appears when the user taps on a list record 203 where the name has been highlighted. The call details 401 for a selected list record 203 preferably includes the following: a phone number 204 identifying an outside calling device to which the present phone device was, at one time, connected; a name 202 associated with the phone number 204; a date stamp 406 for the date of connection to a mobile phone network; a timestamp 408 for the time of day the call was received or initiated; and a duration 410 that the phone device was connect to a mobile phone network.

In the addition the screen for the call details 401 preferably includes a done button 412 and a delete button 414. The done button 412, when activated, takes the phone device back to the preceding call history list. The delete button 414, when activated, removes from memory the list record 203 that corresponds to the selected name 364.

The present invention, however, is not limited to the particular arrangement of FIG. 4 for the display of call details 401. The call details 401, for example, may include simply a phone number 204 and an associated name 202. Alternatively, the call details 401 may include, in addition to what is shown in FIG. 4, a street address, an email address, and an alternative phone number. The particular information displayed in the call details 401 depends on user preferences, information stored in memory, or combination thereof.

Figure 5:
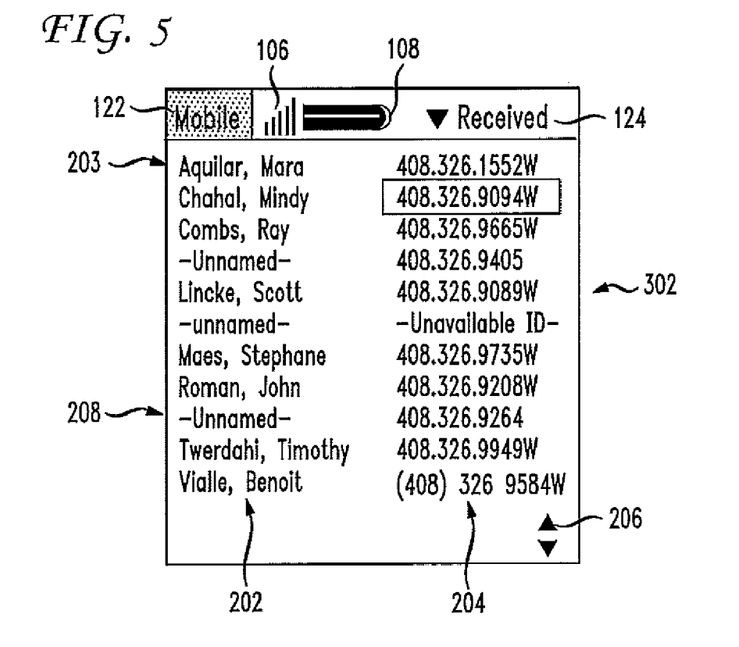
FIG. 5 shows a screen shot of a call history list, which includes at least one list record and a selected phone number, in accordance with one embodiment of the present invention.

FIG. 5 shows a screen shot of a call history list, which includes at least one list record 203 and a selected phone number 502, in accordance with one embodiment of the present invention. FIG. 5 illustrates another example of how the user may initiate a function of the phone device by interacting with the screen through a stylus. For example, the user may tap on a selected phone number 502 if the user wants to initiate the call device 101 of the phone device. The tap recognizer of the PDA 100 senses the selected phone number 502 has been tapped. A rectangle preferably appears around the selected phone number 502.

The call device 101 may be triggered upon tapping a selected phone number 502 in the call history list. FIG. 1, discussed above, shows an example of the screen that is displayed upon tapping a selected phone number 502. The call device 101 is displayed and a phone call is simultaneously initiated to the selected phone number by tapping on selected phone number 502. A phone call 502 is initiated by attempting to contact a device associated with the selected phone number 502. In other words, a wireless signal is transmitted into a mobile phone network, wherein the wireless signal carries required data to contact a device associated with the selected phone number 502.

Figure 6:
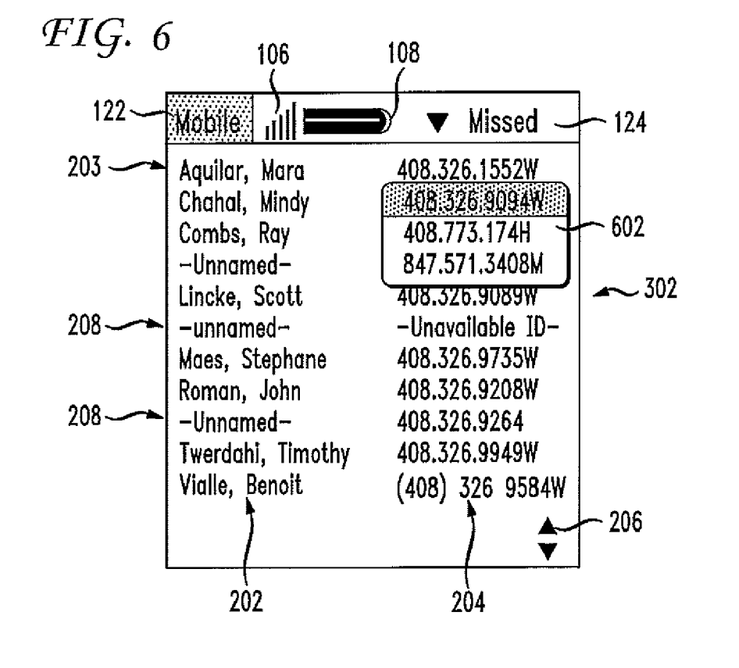
FIG. 6 shows a screen shot of a call history list and address details of a selected phone number, in accordance with one embodiment of the present invention.

FIG. 6 shows a screen shot of a call history list and address details 602 of a selected phone number 502, in accordance with one embodiment of the present invention. FIG. 6 illustrates yet another example of how the user may initiate a function of the phone device by interacting with the screen. The user may tap and hold on a selected phone number 502 if the user wants to view address details 602 of the corresponding list record 203. Address details 602 preferably includes the selected phone number and any other phone numbers that may be associated with the name for the selected phone number 502. In the example of FIG. 6, three phone numbers, including the selected phone number 502 displayed on the main screen, are included in the address details 602. Once the address details are shown on the display device, the user preferably taps the number that the user wants to call. The call device 101 is then triggered, as discussed above with respect to the discussion of FIG. 5. In an alternative embodiment, the address details 602 includes other user-defined information, such as fax numbers, nicknames, street addresses, etc.

The foregoing description includes a discussion of applications using a call history list. Another type of list is an address list (not shown), as discussed above with respect to FIG. 1. In one embodiment, an address list includes a predefined directory of phone numbers and names associated with those phone numbers. The directory can be organized alphabetically, or chronologically based on date of entry. It should appreciated by one of ordinary skill that the applications discussed above are readily applicable to an address list, a call history, or some other type of list that contains a set of similarly formatted information.

Process Overview

Figure 7:
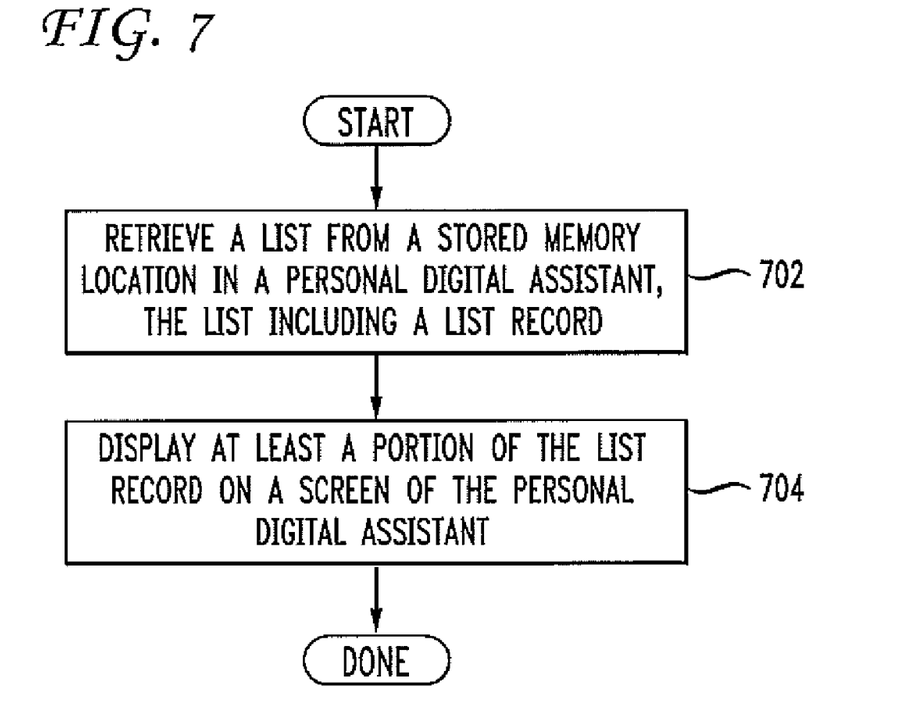
FIG. 7 is a flowchart of a method for managing a phone device of a PDA, such as that shown in FIG. 1, in accordance with one embodiment of the present invention.

FIG. 7 is a flowchart of a method for managing the phone device of a PDA 100, such as that shown in FIG. 1, in accordance with one embodiment of the present invention. The method starts in step 702 in which a list 201 is retrieved from a stored memory location in a PDA 100. The list 201 includes at least one list record 203, as previously described. For example, a user taps the phone status icon 124 to display a set of lists available. The user selects a desired list from the set, which may include, for example, a call history list and an address list. The PDA 100 then retrieves this selected list from a memory of the PDA 100.

The PDA 100 responds in step 704 by displaying a portion of the list record 203 on a screen of the PDA 100. For example, a display device displays a portion of a call history list or a portion of an address list on the screen of the PDA 100.

Figure 8:
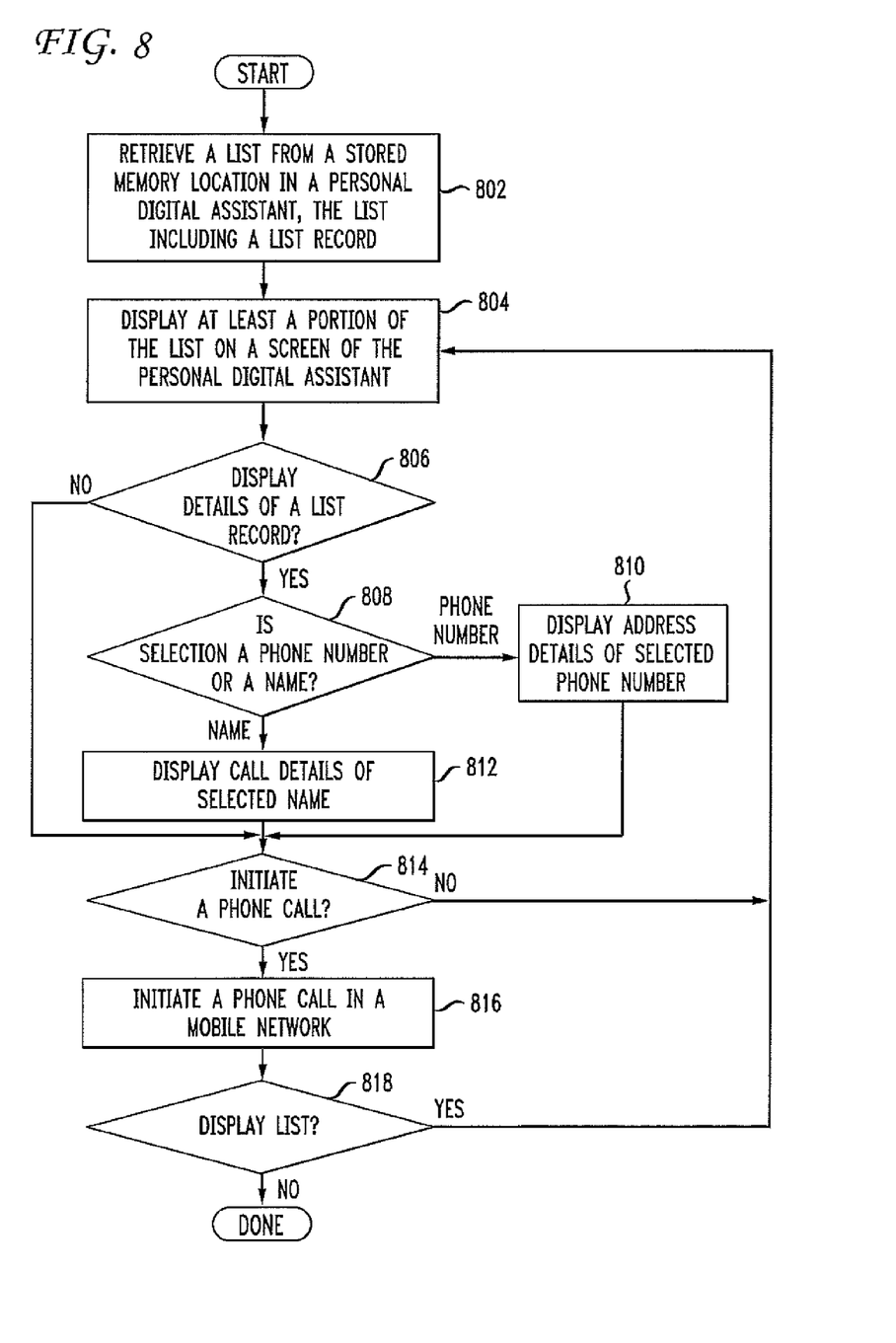
FIG. 8 is a detailed flowchart of a method for managing a phone device of a PDA, such as that shown in FIG. 1, in accordance with one embodiment of the present invention.

FIG. 8 is a detailed flowchart of a method for managing a phone device of a PDA 100, in accordance with one embodiment of the present invention. The method starts in step 802. Method steps 802 and 804 are substantially similar to method steps 702 and 704, respectively, of FIG. 7. Both the methods of FIG. 7 and FIG. 8 are preferably implemented in one or more PDA 100 programs or processes.

The method of FIG. 8 enters a decision operation 806, where it is determined whether details of a selected list record is to be displayed. If details of a selected list record is to be displayed, then the following steps depend on whether the details of a selected phone number 502 or a selected name 304 are to be displayed. This determination between selected phone number 502 and selected name 304 is indicated by decision operation 808. For example, a user may tap and hold on a selected phone number 502. In step 810, address details 602 of the corresponding list record 203 are then displayed, as discussed above with reference to FIG. 6. In another example, a user may tap on a name in a call history list. In step 812, call details 401 of the corresponding call history list are then displayed, as discussed above with reference to FIG. 3.

If, in operation 806, details of a selected list record is not to be displayed, the phone device may determine, in operation 814, whether a phone call is to be initiated. If a phone call is not to be initiated, then the PDA 100 continues, in step 804, to display at least a portion of the list on a screen of the PDA 100. If, however, a phone call is to be initiated, then in step 816 a phone call is initiated in a mobile phone network. For example, a user may tap on a selected phone number 502. In a preferred embodiment, the call device 101 of the phone device is then triggered and a phone call is simultaneously initiated, as discussed above with reference to FIG. 5.

After a phone call has been initiated, a user may or may not want to display the list 201 again. Such a determination by the phone device is indicated by the decision operation 818. If the list 201 is to be displayed, then the PDA 100 returns to step 804 and displays at least a portion of the list on a screen of the PDA 100. If, however, the list 201 is not to be displayed, the process is done.

Hardware Overview

Figure 9:
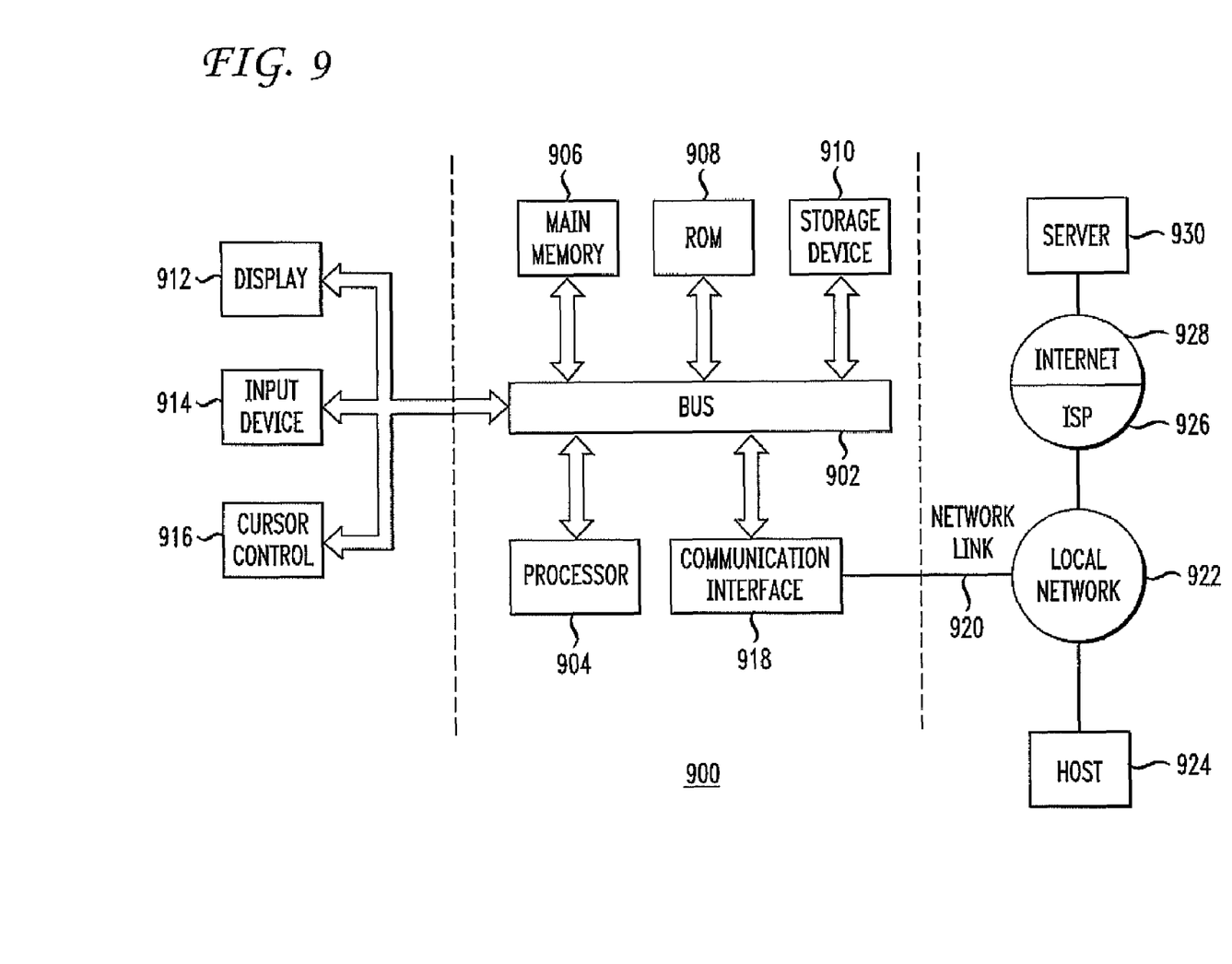
FIG. 9 is a block diagram that illustrates a computer system for a PDA, such as that shown in FIG. 1, upon which an embodiment of the invention may be implemented.

FIG. 9 is a block diagram that illustrates a computer system 900 for a PDA 100, such as that shown in FIG. 1, upon which an embodiment of the invention may be implemented. The preferred embodiment is implemented using one or more computer programs running on a portable computer, such as a PDA 100. Thus, in this embodiment, the computer system 900 is a PDA 100.

Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), for displaying information to a computer user. An input device 914 is a touch-sensitive LCD that interprets by sensing contact on the LCD, and is coupled to bus 902 for communicating information and command selections to processor 904. Another type of input device 914 includes alphanumeric and other keys, and is coupled to bus 902 for communicating information and command selections to processor 904. Still another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for providing mobile phone applications in a PDA 100. According to one embodiment of the invention, mobile phone applications are provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic-tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector coupled to bus 902 can receive the data carried in the infra-red signal and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. As an example, the communication interface 918 is connected to an antennae and performs wireless communications to a network, such as Internet ISP 926 or local network 922. In another example, the communication interface 918 connects to a mobile phone network to complete calls initiated by the process of the present invention. In still another example, communication interface 918 is an integrated services digital network (ISDN) card or a modem to provide a data communication connection to a corresponding type of telephone line. In yet another example, communication interface 918 is a local area network (LAN) card that provides a data communication connection to a compatible LAN. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

Scope

In this disclosure, including in the claims, certain process steps are set forth in a particular order, and alphabetic and alphanumeric labels may be used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An electronic device for initiating phone calls, comprising:
 a processor adapted to execute a telephone communication program in which a set of calls lists is generated, the set of calls lists including at least one of a call history list, a missed calls list, an incoming calls list, an outgoing calls list, a received calls list and an address list, each of the calls lists including a set of records having at least one of a name and a number;

a memory unit adapted to store the set of calls lists; and a display screen structure having a tap recognizer, the tap recognizer being adapted to detect a first tap type and a second tap type, the display screen structure being coupled to the processor for displaying the set of calls lists such that each of the calls lists in the set is selectable by a user, wherein:

when a calls list is selected in the display screen structure by the user, the processor is adapted to retrieve the calls list from the memory unit and cause the display screen structure to display at least a portion of the records in the selected calls list; and when the tap recognizer detects:

the first tap type on a number in a specific record of the selected list, the processor causes a first set of information related the specific record to be shown on the display screen structure;

the first tap type on a name in a specific record of the displayed selected list, the processor causes a second set of information related the specific record to be shown on the display screen structure; and the second tap type on a display name or number in a specific record of the displayed selected list, the processor initiates a phone call according to the number of the specific record.

2. The electronic device of claim 1, wherein the first set of information obtained by a first tap type on a number in the specific record includes a set of phone numbers associated with the specific record.

3. The electronic device of claim 2, wherein the display screen structure displays the first set of information in the form of a drop down menu.

4. The electronic device of claim 3, wherein the drop down menu is positioned at the display number of the specific record with the selected list shown in the background.

5. The electronic device of claim 1, wherein the second set of information obtained by a first tap type on a name in the specific record includes information associated with the selected call list.

6. The electronic device of claim 5, wherein when the selected call list comprises a call history list including a number of calls, and the second set of information associated with a specific call record includes a summary of the call.

7. The method of claim 6, wherein the summary of the call includes a name, a date, a time, and a call duration.

8. The method of claim 1, wherein the electronic device is a portable computer.

9. A method of managing an electronic device having telephone communication capability, the method comprising the steps of:

displaying on a display screen a set of selectable call lists including at least one of, a call history list, a missed calls list, an incoming calls list, an outgoing calls list, a received calls list, and an address list;

retrieving call records associated with a selected call list, each of the call records including at least one of a number and a name;

displaying at least one of the number and name in the call records of at least a portion of the selected call list, each of the call records being selectable by tapping on the display screen;

detecting one of a first type of tapping and a second type of tapping on a call record on the display screen;

upon detection of the first type of tapping, displaying a first set of information related to the call record if the tapping is detected at the number, and displaying a second set of information if the tapping is detected at the name on the display screen; and upon detection of the second type of tapping on the display screen, initiating a phone call according to the number in the tapped call record.

10. The method of claim 9, wherein the first set of information comprises a set of phone numbers associated with the tapped call record.

11. The method of claim 10, wherein the first set of information is provided in the form of a drop down menu.

12. The method of claim 9, wherein the second set of information comprises information related to the selected list.

13. The method of claim 9, wherein if the selected call list is a call history list, and the second set of information comprises a summary of the call in the tapped call record.

14. The method of claim 13, wherein the summary comprises a name, a date, a time and a duration of the call in the tapped call record.

15. A computer readable medium having stored instructions that when executed on a processor of a computer system having a touch-sensitive display screen, implements a method of managing an electronic device adapted for telephone communication, the method comprising:

displaying on the display screen a set of selectable call lists including at least one of a call history list, missed, incoming, outgoing, and received call lists and an address list;

retrieving call records associated with a selected call list, each of the call records including at least a number and a name;

displaying at least the number and name in the call records of at least a portion of the selected list, each of the call records being selectable by tapping on the display screen;

detecting one of a first type of tapping and a second type of tapping on a call record on the display screen;

upon detection of the first type of tapping, displaying a first set of information related to the call record if the tapping is detected at the number, and a second set of information if the tapping is detected at the name on the display screen; and upon detection of the second type of tapping on the display screen, initiating a phone call according to the number in the tapped call record.

16. The computer readable medium of claim 15, wherein the first set of information comprises a set of phone numbers associated with the tapped call record.

17. The computer readable medium of claim 16, wherein the first set of information is provided in the form of a drop down menu.

18. The computer readable medium of claim 13, wherein if the selected call list is a call history list, the second set of information comprises a summary of the call in the tapped call record.

19. The computer readable medium of claim 18, wherein the summary comprises a name, a date, a time and a duration of the call in the tapped call record.

20. A method of managing an electronic device having phone functionality and a screen including a tap recognizer, the method comprising:

retrieving a call history list from a stored memory location, the call history list comprising a plurality of call history list records; and displaying at least two call history list records from the plurality of call history records on a screen of the electronic device;

tapping the screen to select a call history list record from the displayed list records; and initiating a call according to the tapped call history list record.

21. The method of claim 20, wherein the call history list record comprises an address.

22. The method of claim 21, wherein the address includes a name and a phone number associated with the name.

23. The method of claim 22, further including the steps of: tapping an address; and displaying phone number details of a selected address, the phone number details including the phone number and at least one other phone number.

24. The method of claim 20, wherein the call history list record includes a phone number and a name associated with the phone number.

25. The method of claim 20, further including displaying call details of a selected call history record, the call details including a date, a timestamp, and a duration.

26. The method of claim 20, wherein the call history record is configured to identify any of an incoming, an outgoing, a missed, and a received call.

27. The method of claim 20, further comprising initiating a phone call in a phone network, wherein the phone call is configured to attempt to contact a device associated with a phone number associated with a selected list record.

28. The method of claim 20, wherein the tap recognizer senses a selection on the screen.

29. A method of managing a phone device of an electronic device, comprising:

retrieving a list of call records from a stored memory location;

displaying said list of call records on a touch sensitive display in a tabular format displaying at least one of a name field and a number field for each displayed record; and displaying a first set of information related to a specific call record upon performance of a first tap type on the number field of the specific record; and displaying a second set of information different from the first set of information and related to the specific record upon performance of first tap type on the name field of the specific record.

30. The method according to claim 28, wherein the touch sensitive display is part of a handheld computer.

* * * * *

US007664485C1

(12) EX PARTE REEXAMINATION CERTIFICATE (10245th)
United States Patent
Twerdahl et al.

(10) Number: US 7,664,485 C1
(45) Certificate Issued: *Aug. 6, 2014

(54) MAKING A PHONE CALL FROM AN ELECTRONIC DEVICE HAVING AN ADDRESS LIST OR A CALL HISTORY LIST

(75) Inventors: Tim Twerdahl, Los Altos, CA (US); Stephane Maes, Mountain View, CA (US); Benoit Vialle, Evanston, IL (US); Ryan Robertson, Seattle, WA (US)

(73) Assignee: Access Systems Americas, Inc., Sunnyvale, CA (US)

Reexamination Request:
No. 90/013,054, Nov. 13, 2013

Reexamination Certificate for:
Patent No.: 7,664,485
Issued: Feb. 16, 2010
Appl. No.: 11/927,698
Filed: Oct. 30, 2007

( * ) Notice: This patent is subject to a terminal disclaimer.

Related U.S. Application Data

(63) Continuation of application No. 09/677,831, filed on Sep. 29, 2000, now Pat. No. 7,289,614.

(51) Int. Cl.
*H04B 1/38* (2006.01)

(52) U.S. Cl.
USPC .................. 455/408; 455/414.3; 455/422.1; 455/426; 455/466; 455/557; 379/88.02; 379/201.01; 709/204; 705/39; 705/40; 715/207

(58) Field of Classification Search
None
See application file for complete search history.

(56) References Cited

To view the complete listing of prior art documents cited during the proceeding for Reexamination Control Number 90/013,054, please refer to the USPTO's public Patent Application Information Retrieval (PAIR) system under the Display References tab.

*Primary Examiner* — Simon Ke (57) ABSTRACT

A method and apparatus of managing a phone device of a personal digital assistant (PDA) is provided. In one example of the present invention, the PDA retrieves a call history list from a stored memory location, the call history list including a call history list record. The PDA then displays at least a portion of the call history list on a screen of the PDA. The call history list preferably includes phone numbers and names associated with those phone numbers. In another example, the method further includes displaying call details of a selected call history list record. The call details preferably includes a date, a timestamp, and a duration.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 20 and 24-28 are cancelled.

Claims 1-19, 21-23 and 29-30 were not reexamined.

\* \* \* \* \*